United States Patent
Alford et al.

(10) Patent No.: US 12,493,545 B2
(45) Date of Patent: Dec. 9, 2025

(54) DEEP-LEARNING SYSTEMS AND METHODS RELATED TO AUTOMATED RESOLUTION OF BREAKING CHANGES IN MICROSERVICE-BASED SOFTWARE APPLICATIONS

(71) Applicant: GENESYS CLOUD SERVICES, INC., Menlo Park, CA (US)

(72) Inventors: William Anthony Alford, Durham, NC (US); Ramya Ananth, Durham, NC (US); Kalpit Patel, Durham, NC (US); Joseph Dominic Zuccarello, Indianapolis, IN (US)

( * ) Notice: Subject to any disclaimer, the term of this patent is extended or adjusted under 35 U.S.C. 154(b) by 249 days.

(21) Appl. No.: 18/533,803

(22) Filed: Dec. 8, 2023

(65) Prior Publication Data

US 2024/0193077 A1    Jun. 13, 2024

Related U.S. Application Data

(60) Provisional application No. 63/431,120, filed on Dec. 8, 2022.

(51) Int. Cl.
    *G06F 11/3668*      (2025.01)
    *G06F 9/455*      (2018.01)

(52) U.S. Cl.
    CPC ...... *G06F 11/3692* (2013.01); *G06F 9/45558* (2013.01); *G06F 2009/45575* (2013.01)

(58) Field of Classification Search
    CPC ....... G06F 2009/45575; G06F 9/45558; G06F 11/3692
See application file for complete search history.

(56) References Cited

U.S. PATENT DOCUMENTS 10,802,953 B2 * 10/2020 Mitchell .................. G06N 3/09
11,269,718 B1    3/2022 Chen et al.
(Continued)

FOREIGN PATENT DOCUMENTS

CN    110046081 A * 7/2019 .......... G06F 11/3409
EP    3798841 A1    3/2021

OTHER PUBLICATIONS

Hailie, "Automatically Fixing Breaking Changes of Data Science Libraries" (Year: 2022).*

(Continued)

*Primary Examiner* — Phillip H Nguyen

(57) ABSTRACT

A method for resolving breaking changes in a software system. The method includes generating a training dataset of training examples by: collecting data associated with test results of tests configured to identify breaking changes in the software system and executed management actions; storing the collected test results data; storing the collected management action data; parsing the stored content and identifying failed test data and management action data relevant to a given failed test for identification as a training example. The method continues by training a machine learning model using the training examples included in the training dataset and then using the trained machine learning model to predict recommended management actions by: detecting a present failed test; determining failed test data; providing the failed test data to the trained machine learning model for generating therewith the recommended management actions.

20 Claims, 7 Drawing Sheets

(56) References Cited

U.S. PATENT DOCUMENTS

| | | |
|---|---|---|
| 2006/0161822 A1 | 7/2006 | Furuta |
| 2019/0068622 A1* | 2/2019 | Lin ................... H04L 63/1441 |
| 2019/0147080 A1 | 5/2019 | Nikitina et al. |
| 2019/0171552 A1* | 6/2019 | Mitchell ................ G06N 20/00 |
| 2019/0171948 A1* | 6/2019 | Pillai ..................... G06N 20/00 |
| 2020/0097389 A1 | 3/2020 | Smith et al. |
| 2020/0117531 A1 | 4/2020 | Sudharsana |
| 2020/0117565 A1 | 4/2020 | Ponnuvel et al. |
| 2021/0263792 A1 | 8/2021 | Vah et al. |
| 2022/0091923 A1 | 3/2022 | O'Toole et al. |
| 2022/0413993 A1* | 12/2022 | Farinas ............... G06N 3/0455 |

OTHER PUBLICATIONS

International Search Report and Written Opinion received Apr. 10, 2024 regarding co-pending PCT application having application No. PCT/US2023/083142.

* cited by examiner

DEEP-LEARNING SYSTEMS AND METHODS RELATED TO AUTOMATED RESOLUTION OF BREAKING CHANGES IN MICROSERVICE-BASED SOFTWARE APPLICATIONS

CROSS REFERENCE TO RELATED APPLICATION

This application claims the benefit of U.S. Provisional Patent Application No. 63/431,120, titled "Deep-Learning Systems and Methods Related to Automated Resolution of Breaking Changes in Microservice-Based Software Applications", filed in the U.S. Patent and Trademark Office on Dec. 8, 2022, the contents of which are incorporated herein.

BACKGROUND

The present invention generally relates to customer relations services and customer relations management via contact centers and associated cloud-based systems. More particularly, but not by way of limitation, the present invention pertains to an automated tool for resolving breaking changes in a microservice-based software application.

BRIEF DESCRIPTION OF THE INVENTION

The present invention includes a method for resolving breaking changes in a software system. The method includes generating, via an automated training data process, a training dataset including training examples. When described in relation to the generation of a first training example that is representative of how each of the training examples are generated, the automated training data process includes: monitoring one or more communication channels, the one or more communication channels for collecting data associated with test results associated with respective tests configured to identify breaking changes occurring in the software system and management actions executed in the software system; storing test results data collected in relation to the test results in a timestamped historical test result database; storing management action data collected in relation to the executed management actions in a timestamped historical management action database; parsing content in the historical test result database and identifying failed test data associated with a first failed test of the test results; parsing content in the historical management actions database and identifying first management action data relevant to the first failed test, the first management action data including data describing the management actions taken between the first failed test and a next successful execution of the test of the first failed test; and identifying the first failed test data and the first management action data as the first training example. The method continues with the step of training a machine learning model using the training examples included in the training dataset. The method continues with the step of using the trained machine learning model to predict one or more recommended management actions by: detecting a present failed test indicating a breaking change in the software system; determining failed test data associated with the present failed test; providing the failed test data to the trained machine learning model as an input and generating therewith the one or more recommended management actions as an output.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components, wherein.

DETAILED DESCRIPTION

Figure 1:
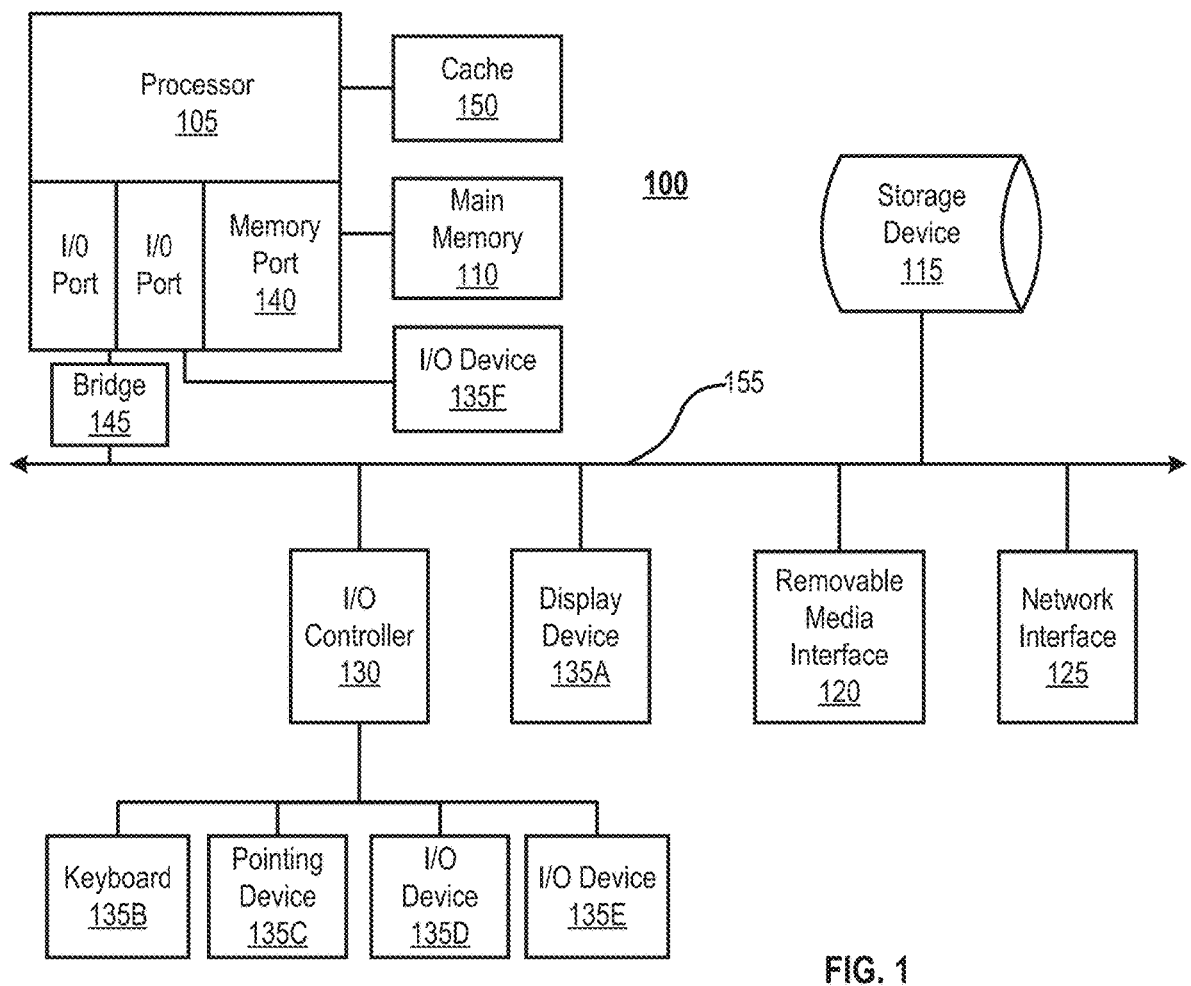
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. Additionally, further modification in the provided examples or application of the principles of the invention, as presented herein, are contemplated as would normally occur to those skilled in the art. Particular features, structures or characteristics may be combined in any suitable combinations and/or sub-combinations in one or more embodiments or examples. Those skilled in the art will recognize that various embodiments may be computer implemented using many different types of data processing equipment, with embodiments being implemented as an apparatus, method, or computer program product. Example embodiments, thus, may take the form of a hardware embodiment, a software embodiment, or combination thereof.

Computing Device

The present invention may be computer implemented using different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced.

The computing device 100, for example, may be implemented via firmware (e.g., an application-specific integrated circuit), hardware, or a combination of software, firmware, and hardware. Each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to the computing systems described in the following figures-such as, for example, the contact center 200 of FIG. 2—the various servers and computer devices thereof may be located on local computing devices 100 (i.e., on-site or at the same physical location as contact center agents), remote computing devices 100 (i.e., off-site or in a cloud computing environment, for example, in a remote data center connected to the contact center via a network), or some combination thereof. Functionality provided by servers located on off-site computing devices may be accessed and provided over a virtual private network (VPN), as if such servers were on-site, or the functionality may be provided using a software as a service (SaaS) accessed over the Internet using various protocols, such as by exchanging data via extensible markup language (XML), JSON, and the like.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the processor 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be accessed by the central processing unit 105. The storage device 115 may provide storage for an operating system, which controls scheduling tasks and access to system resources, and other software. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. More generally, the I/O devices 135 may include any conventional devices for performing the functionality described herein.

Unless otherwise limited, the computing device 100 may be any workstation, desktop computer, laptop or notebook computer, server machine, virtualized machine, mobile or smart phone, portable telecommunication device, media playing device, or any other type of computing, telecommunications or media device, without limitation, capable of performing the operations and functionality described herein. The computing device 100 may include a plurality of such devices connected by a network or connected to other systems and resources via a network. Unless otherwise limited, the computing device 100 may communicate with other computing devices 100 via any type of network using any conventional communication protocol.

Contact Center

Figure 2:
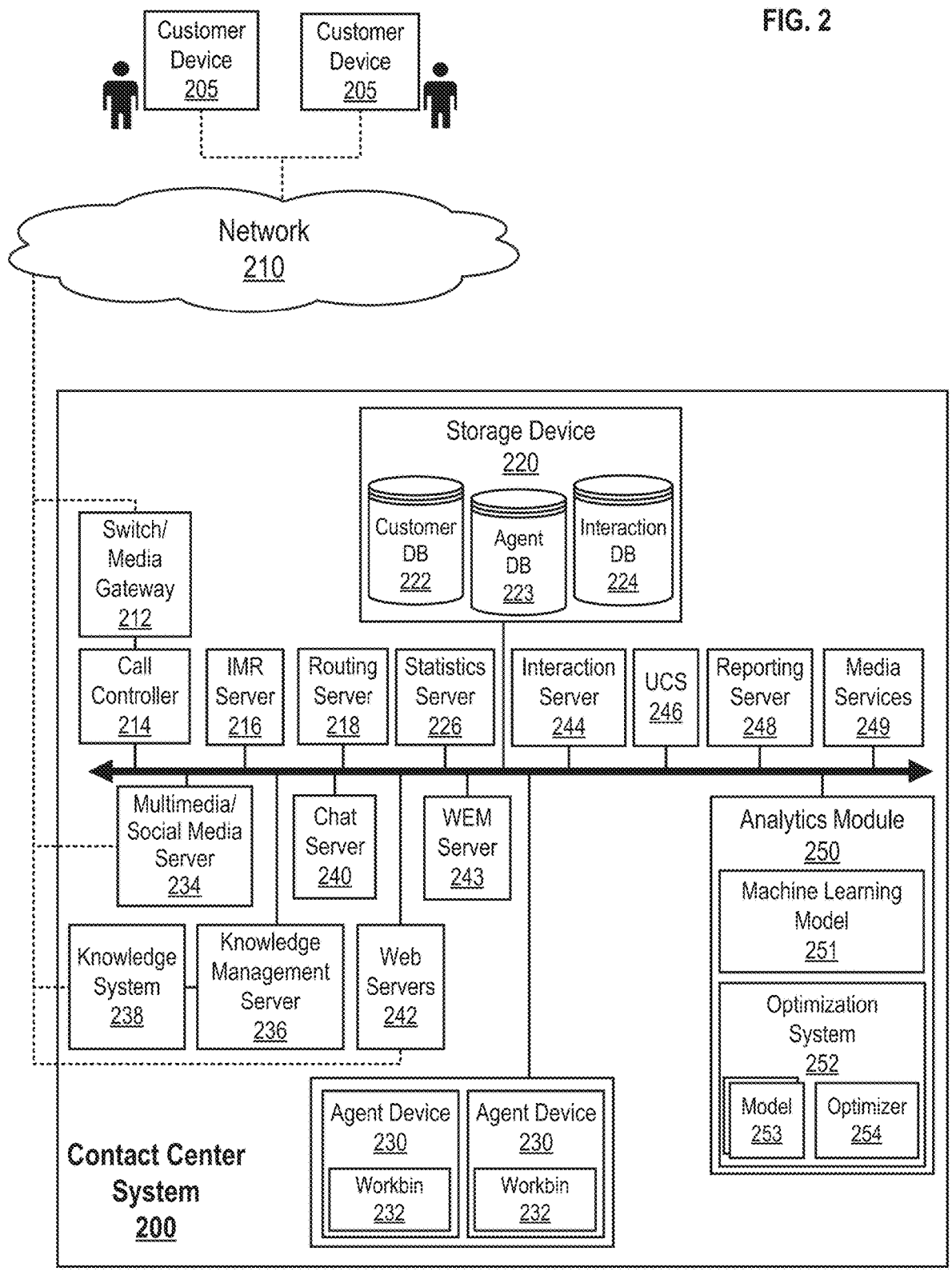
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system (or simply "contact center") 200 is shown in accordance with exemplary embodiments of the present invention and/or with which exemplary embodiments of the present invention may be enabled or practiced. By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may assist customers in making purchasing decisions, receiving orders, or solving problems with products or services already received. Within a contact center, such interactions between agents and customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Operationally, contact centers generally strive to provide quality services to customers while minimizing costs. For example, one way for a contact center to operate is to handle every customer interaction with a live agent. While this approach may score well in terms of the service quality, it likely would also be prohibitively expensive due to the high cost of agent labor. Because of this, most contact centers utilize automated processes in place of live agents, such as interactive voice response (IVR) systems, interactive media response (IMR) systems, internet robots or "bots", automated chat modules or "chatbots", and the like.

Referring specifically to FIG. 2, the contact center 200 may be used by a customer service provider to provide various types of services to customers. For example, the contact center 200 may be used to engage and manage interactions in which automated processes (or bots) or human agents communicate with customers. The contact center 200 may be an in-house facility of a business or enterprise for performing the functions of sales and customer service relative to products and services available through the enterprise. In another aspect, the contact center 200 may be operated by a service provider that contracts to provide customer relation services to a business or organization. Further, the contact center 200 may be deployed on equipment dedicated to the enterprise or third-party service provider, and/or deployed in a remote computing environment such as, for example, a private or public cloud environment with infrastructure for supporting multiple contact centers for multiple enterprises. The contact center 200 may include software applications or programs, which may be executed on premises or remotely or some combination thereof. It should further be appreciated that the various components of the contact center 200 may be distributed across various geographic locations.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with the illustrated example of FIG. 2, the components or modules of the contact center 200 may include: a plurality of customer devices 205; communications network (or simply "network") 210; switch/media gateway 212; call controller 214; interactive media response (IMR) server 216; routing server 218; storage device 220; statistics server 226; plurality of agent devices 230 that each have a workbin 232; multimedia/social media server 234; knowledge management server 236 coupled to a knowledge system 238; chat server 240; web servers 242; interaction server 244; universal contact server (or "UCS") 246; reporting server 248; media services server 249; and an analytics module 250. It should be understood that any of the computer-implemented components, modules, or servers described in relation to FIG. 2 or in any of the following figures may be implemented via computing devices, such as the computing device 100 of FIG. 1. As will be seen, the contact center 200 generally manages resources (e.g., personnel, computers, telecommunication equipment, etc.) to enable the delivery of services via telephone, email, chat, or other communication mechanisms. The various components, modules, and/or servers of FIG. 2 (and other figures included herein) each may include one or more processors executing computer program instructions and interacting with other system components for performing the various functionalities described herein. Further, the terms "interaction" and "communication" are used interchangeably, and generally refer to any real-time and non-real-time interaction that uses any communication channel including, without limitation, telephone calls (PSTN or VoIP calls), emails, voicemails, video, chat, screen-sharing, text messages, social media messages, WebRTC calls, etc. Access to and control of the components of the contact system 200 may be affected through user interfaces (UIs) which may be generated on the customer devices 205 and/or the agent devices 230.

Customers desiring to receive services from the contact center 200 may initiate inbound communications (e.g., telephone calls, emails, chats, etc.) to the contact center 200 via a customer device 205. While FIG. 2 shows two such customer devices it should be understood that any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center 200, such as telephone calls, emails, chats, text messages, web-browsing sessions, and other multi-media transactions. Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include a wireless carrier network including a code division multiple access network, global system for mobile communications (GSM) network, or any wireless network/technology conventional in the art.

The switch/media gateway 212 may be coupled to the network 210 for receiving and transmitting telephone calls between customers and the contact center 200. The switch/media gateway 212 may include a telephone or communication switch configured to function as a central switch for agent routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. In general, the switch/media gateway 212 establishes a voice connection between the customer and the agent by establishing a connection between the customer device 205 and agent device 230. The switch/media gateway 212 may be coupled to the call controller 214 which, for example, serves as an adapter or interface between the switch and the other routing, monitoring, and communication-handling components of the contact center 200. The call controller 214 may be configured to process PSTN calls, VOIP calls, etc. The call controller 214 may include computer-telephone integration (CTI) software for interfacing with the switch/media gateway and other components. The call controller 214 may extract data about an incoming interaction, such as the customer's telephone number, IP address, or email address, and then communicate these with other contact center components in processing the interaction.

The interactive media response (IMR) server 216 enables self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. Through continued interaction with the IMR server 216, customers may receive service without needing to speak with an agent. The IMR server 216 may ascertain why a customer is contacting the contact center so to route the communication to the appropriate resource.

The routing server 218 routes incoming interactions. For example, once it is determined that an inbound communication should be handled by a human agent, functionality within the routing server 218 may select the most appropriate agent and route the communication thereto. This type of functionality may be referred to as predictive routing. Such agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230, which may enhance the service the agent is able to provide.

Regarding data storage, the contact center 200 may include one or more mass storage devices—represented generally by the storage device 220—for storing data in one or more databases. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center 200 may include agent availability and agent profiles, schedules, skills, average handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center 200 in ways that facilitate the functionality described herein. For example, the servers or modules of the contact center 200 may query such databases to retrieve data stored therewithin or transmit data thereto for storage.

The statistics server 226 may be configured to record and aggregate data relating to the performance and operational aspects of the contact center 200. Such information may be compiled by the statistics server 226 and made available to other servers and modules, such as the reporting server 248, which then may produce reports that are used to manage operational aspects of the contact center and execute automated actions in accordance with functionality described herein. Such data may relate to the state of contact center resources, e.g., average wait time, abandonment rate, agent occupancy, and others as functionality described herein would require.

The agent devices 230 of the contact center 200 may be communication devices configured to interact with the various components and modules of the contact center 200 to facilitate the functionality described herein. An agent device 230, for example, may include a telephone adapted for regular telephone calls or VOIP calls. An agent device 230 may further include a computing device configured to communicate with the servers of the contact center 200, perform data processing associated with operations, and interface with customers via voice, chat, email, and other multimedia communication mechanisms according to functionality described herein. While only two such agent devices are shown, any number may be present.

The multimedia/social media server 234 may be configured to facilitate media interactions (other than voice) with the customer devices 205 and/or the servers 242. Such media interactions may be related, for example, to email, voicemail, chat, video, text-messaging, web, social media, co-browsing, etc. The multi-media/social media server 234 may take the form of any IP router conventional in the art with specialized hardware and software for receiving, processing, and forwarding multi-media events and communications.

The knowledge management server 234 may be configured to facilitate interactions between customers and the knowledge system 238. In general, the knowledge system 238 may be a computer system capable of receiving questions or queries and providing answers in response. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

The chat server 240 may be configured to conduct, orchestrate, and manage electronic chat communications with customers. Such chat communications may be conducted by the chat server 240 in such a way that a customer communicates with automated chatbots, human agents, or both. The chat server 240 may perform as a chat orchestration server that dispatches chat conversations among chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature. The chat server 240 may be configured to transfer chats within a single chat session with a particular customer between automated and human sources. The chat server 240 may be coupled to the knowledge management server 234 and the knowledge systems 238 for receiving suggestions and answers to queries posed by customers during a chat so that, for example, links to relevant articles can be provided.

The web servers 242 provide site hosts for a variety of social interaction sites to which customers subscribe, such as Facebook, Twitter, Instagram, etc. Though depicted as part of the contact center 200, it should be understood that the web servers 242 may be provided by third parties and/or maintained remotely. The web servers 242 may also provide webpages for the enterprise or organization being supported by the contact center 200. For example, customers may browse the webpages and receive information about the products and services of a particular enterprise. Within such enterprise webpages, mechanisms may be provided for initiating an interaction with the contact center 200, for example, via web chat, voice, or email. An example of such a mechanism is a widget, which can be deployed on the webpages or websites hosted on the web servers 242. As used herein, a widget refers to a user interface component that performs a particular function. In some implementations, a widget includes a GUI that is overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Such widgets may include additional user interfaces and be configured to access a variety of local resources (e.g., a calendar or contact information on the customer device) or remote resources via network (e.g., instant messaging, electronic mail, or social networking updates).

The interaction server 244 is configured to manage deferrable activities of the contact center and the routing thereof to human agents for completion. As used herein, deferrable activities include back-office work that can be performed off-line, e.g., responding to emails, attending training, and other activities that do not entail real-time communication with a customer.

The universal contact server (UCS) 246 may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer, such as data related to comments from agents, customer communication history, and the like. Each of these data types then may be stored in the customer database 222 or on other modules and retrieved as functionality described herein requires.

The reporting server 248 may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to a request and used toward managing the contact center in accordance with functionality described herein.

The media services server 249 provides audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, audio and video transcoding, secure real-time transport protocol (SRTP), audio or video conferencing, call analysis, keyword spotting, etc.

The analytics module 250 may be configured to perform analytics on data received from a plurality of different data sources as functionality described herein may require. The analytics module 250 may also generate, update, train, and modify predictors or models, such as machine learning model 251 and/or models 253, based on collected data. To achieve this, the analytics module 250 may have access to the data stored in the storage device 220, including the customer database 222 and agent database 223. The analytics module 250 also may have access to the interaction database 224, which stores data related to interactions and interaction content (e.g., audio and transcripts of the interactions and events detected therein), interaction metadata (e.g., customer identifier, agent identifier, medium of interaction, length of interaction, interaction start and end time, department, tagged categories), and the application setting (e.g., the interaction path through the contact center). The analytic module 250 may retrieve such data from the storage device 220 for developing and training algorithms and models. It should be understood that, while the analytics module 250 is depicted as being part of a contact center, the functionality described in relation thereto may also be implemented on customer systems (or, as also used herein, on the "customer-side" of the interaction) and used for the benefit of customers.

The machine learning model 251 may include one or more machine learning models, which may be based on neural networks. In certain embodiments, the machine learning model 251 is configured as a deep learning model, which is a type of machine learning based on neural networks in which multiple layers of processing are used to extract progressively higher level features from data. As an example, the machine learning model 251 may be configured to predict behavior. Such behavioral models may be trained to predict the behavior of customers and agents in a variety of situations so that interactions may be personally tailored to customers and handled more efficiently by agents. As another example, the machine learning model 251 may be configured to predict aspects related to contact center operation and performance. In other cases, for example, the machine learning model 251 also may be configured to perform natural language processing and, for example, provide intent recognition and the like.

The analytics module 250 may further include an optimization system 252. The optimization system 252 may include one or more models 253, which may include the machine learning model 251, and an optimizer 254. The optimizer 254 may be used in conjunction with the models 253 to minimize a cost function subject to a set of constraints, where the cost function is a mathematical representation of desired objectives or system operation. Because the models 253 are typically non-linear, the optimizer 254 may be a nonlinear programming optimizer. It is contemplated, however, that the optimizer 254 may be implemented by using, individually or in combination, a variety of different types of optimization approaches, including, but not limited to, linear programming, quadratic programming, mixed integer non-linear programming, stochastic programming, global non-linear programming, genetic algorithms, particle/swarm techniques, and the like. The analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, allocation of system resources, system analytics, or other functionality related to automated processes.

Figure 3:
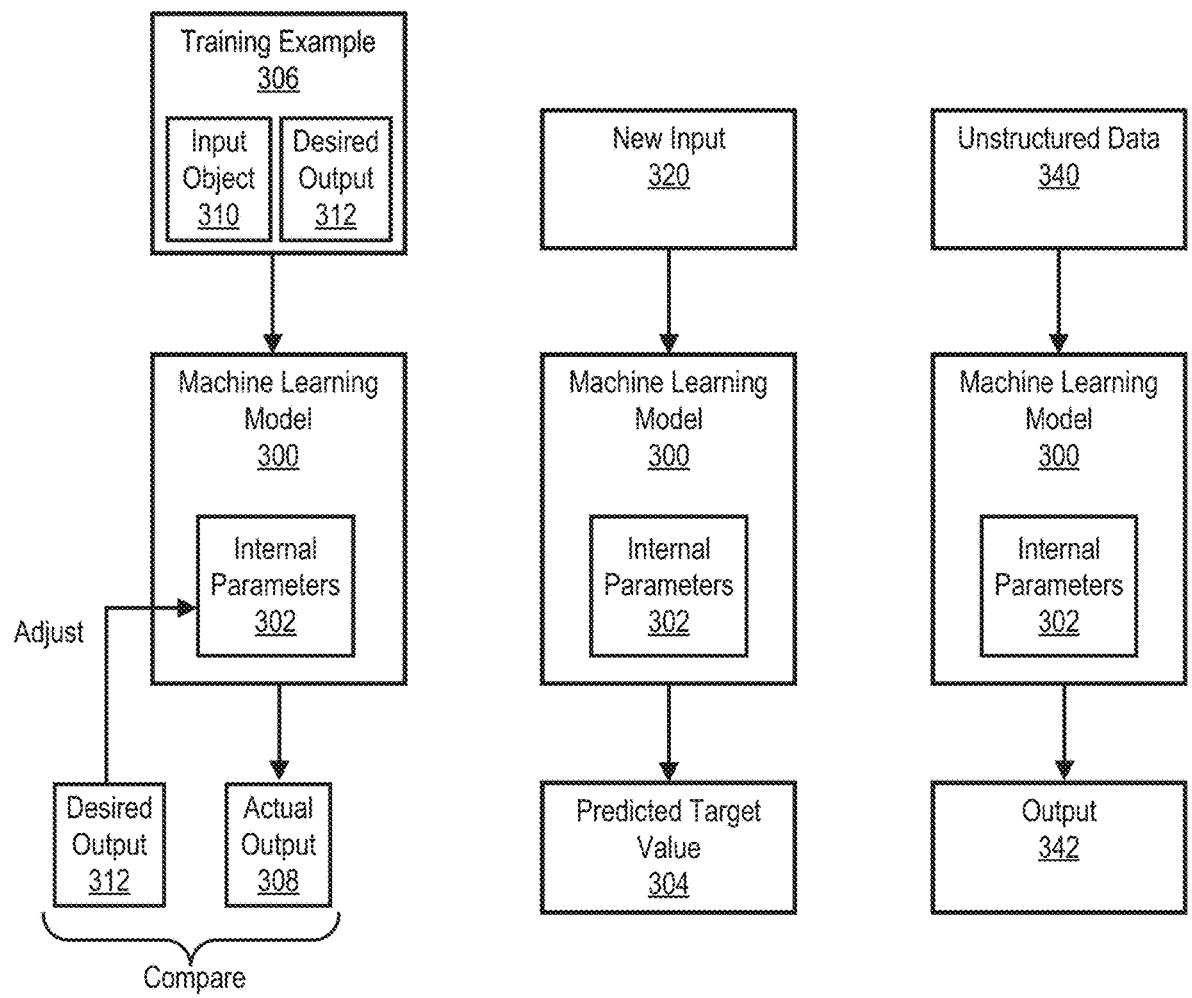
FIG. 3 is a schematic representation of a machine learning model in accordance with exemplary operation of embodiments of the present invention.

FIG. 3 illustrates an exemplary machine learning model 300. The machine learning model 300 may be a component, module, computer program, system, or algorithm. As described below, some embodiments herein use machine learning for diagnosing breaking changes and implementing solutions to resolve diagnosed problems causing the breaking change and return the system to normal functioning. Machine learning model 300 may be used as the model to power those embodiments. Machine learning model 300 is trained with training examples 306, which may include an input object 310 and a desired output value 312. For example, the input object 310 and desired object value 312 may be tensors. A tensor is a matrix of n dimensions where n may be any of 0 (a constant), 1 (an array), 2 (a 2D matrix), 3, 4, or more.

The machine learning model 300 has internal parameters that determine its decision boundary and that determine the output that the machine learning model 300 produces. After each training iteration, which includes inputting the input object 310 of a training example into the machine learning model 300, the actual output 308 of the machine learning model 300 for the input object 310 is compared to the desired output value 312. One or more internal parameters 302 of the machine learning model 300 may be adjusted such that, upon running the machine learning model 300 with the new parameters, the produced output 308 will be closer to the desired output value 312. If the produced output 308 was already identical to the desired output value 312, then the internal parameters 302 of the machine learning model 300 may be adjusted to reinforce and strengthen those parameters that caused the correct output and reduce and weaken parameters that tended to move away from the correct output.

The machine learning model 300 output may be, for example, a numerical value in the case of regression or an identifier of a category in the case of classifier. A machine learning model trained to perform regression may be referred to as a regression model and a machine learning model trained to perform classification may be referred to as a classifier. The aspects of the input object that may be considered by the machine learning model 300 in making its decision may be referred to as features. After machine learning model 300 has been trained, a new, unseen input object 320 may be provided as input to the model 300. The machine learning model 300 then produces an output representing a predicted target value 304 for the new input object 320, based on its internal parameters 302 learned from training.

The machine learning model 300 may be, for example, a neural network, support vector machine (SVM), Bayesian network, logistic regression, logistic classification, decision tree, ensemble classifier, or other machine learning model. Machine learning model 300 may be supervised or unsupervised. In the unsupervised case, the machine learning model 300 may identify patterns in unstructured data 340 without training examples 306. Unstructured data 340 is, for example, raw data upon which inference processes are desired to be performed. An unsupervised machine learning model may generate output 342 that comprises data identifying structure or patterns.

The neural network may be comprised of a plurality of neural network nodes, where each node includes input values, a set of weights, and an activation function. The neural network node may calculate the activation function on the input values to produce an output value. The activation function may be a non-linear function computed on the weighted sum of the input values plus an optional constant. In some embodiments, the activation function is logistic, sigmoid, or a hyperbolic tangent function. Neural network nodes may be connected to each other such that the output of one node is the input of another node. Moreover, neural network nodes may be organized into layers, each layer including one or more nodes. An input layer may include the inputs to the neural network and an output layer may include the output of the neural network. A neural network may be trained and update its internal parameters, which include the weights of each neural network node, by using backpropagation.

In some embodiments, a convolutional neural network (CNN) may be used. A convolutional neural network is a type of neural network and machine learning model. A convolutional neural network may include one or more convolutional filters, also known as kernels, that operate on the outputs of the neural network layer that precede it and produce an output to be consumed by the neural network layer subsequent to it. A convolutional filter may have a window in which it operates. The window may be spatially local. A node of the preceding layer may be connected to a node in the current layer if the node of the preceding layer is within the window. If it is not within the window, then it is not connected. A convolutional neural network is one kind of locally connected neural network, which is a neural network where neural network nodes are connected to nodes of a preceding layer that are within a spatially local area. Moreover, a convolutional neural network is one kind of sparsely connected neural network, which is a neural network where most of the nodes of each hidden layer are connected to fewer than half of the nodes in the subsequent layer. In other embodiments, a recurrent neural network (RNN) may be used. A recurrent neural network is another type of neural network and machine learning model. A recurrent neural network includes at least one back loop, where the output of at least one neural network node is input into a neural network node of a prior layer. The recurrent neural network maintains state between iterations, such as in the form of a tensor. The state is updated at each iteration, and the state tensor is passed as input to the recurrent neural network at the new iteration. In still other embodiments, the recurrent neural network is a long short-term (LSTM) memory neural network. In some embodiments, the recurrent neural network is a bi-directional LSTM neural network. A feed forward neural network is another type of a neural network and has no back loops. In some embodiments, a feed forward neural network may be densely connected, meaning that most of the neural network nodes in each layer are connected to most of the neural network nodes in the subsequent layer. In some embodiments, the feed forward neural network is a fully-connected neural network, where each of the neural network nodes is connected to each neural network node in the subsequent layer. A gated graph sequence neural network (GGSNN) is a type of neural network that may be used in some embodiments. In a GGSNN, the input data is a graph, comprising nodes and edges between the nodes, and the neural network outputs a graph. The graph may be directed or undirected. A propagation step is performed to compute node representations for each node, where node representations may be based on features of the node. An output model maps from node representations and corresponding labels to an output for each node. The output model is defined per node and is a differentiable function that maps to an output. Further, embodiments may include neural networks of different types or the same type that are linked together into a sequential or parallel series of neural networks, where subsequent neural networks accept as input the output of one or more preceding neural networks. The combination of multiple neural networks may be trained from end-to-end using backpropagation from the last neural network through the first neural network. As stated, the machine learning model 251 may also be configured as a deep learning model. The deep learning model is type of machine learning based on neural networks in which multiple layers of processing are used to extract progressively higher level features from data. Deep learning models are generally more adept at unsupervised learning.

Turning now more specifically to the invention of the present disclosure, example embodiments may include machine learning and/or deep learning models for automatedly resolving breaking changes in microservice-based software applications. As will be appreciated, when a breaking change occurs in such software systems, the resolution often constitutes a manual process. For example, in a typical situation, when an automated test fails, an on-call engineer has to be notified to address the issue. The notified engineer must then manually diagnose and remedy the change that caused the failed test. Because this process requires a "human in the loop," there is time lost while that person gets oriented with the problem and decides how to resolve it. This results in longer downtime for the software system, which can result in financial penalties to the contact center as well as lost customer goodwill. As such, what is needed is a way to automatically remedy breaking changes. Typical remedies for breaking changes include reverting service deployments, reverting feature flag changes, or rebooting virtual machines. These remedies are applied using a centralized system management tool. However, these remedies are often less than optimal.

The present disclosure proposes training a machine learning model to map failed test data, such as execution log messages, to a probability distribution indicating the remedies most likely to correct the failure. In accordance with exemplary embodiments, the training process may be self-supervised learning from past test execution data and data describing what manual remedies were required to resolve the failure. This means that no human intervention or data labeling is needed to create a training dataset, as this information is maintained and can be made available to train and update the model. Once trained, the model can be given a new log message from a failed test and output the remedy most likely to correct the given test failure. Optionally, this remedy may then be automatically applied to the system.

In describing systems and methods of the present invention, the following definitions may be used. As provided herein, a "breaking change" is defined as a change in one part of a software system that causes another component to fail. For example, breaking changes occur often in shared libraries of code used by multiple applications where a change in the shared libraries cause one of the application to fail. In certain cases, a breaking change may constitute an undesirable result or functionality, such as a features not working as expected after a change. A "microservice-based software application" is defined as an application that is structured as a collection of services that are maintainable and testable, loosely coupled, and independently deployable. This type of architecture—or "microservice architecture"— enables the rapid and reliable delivery of large, complex applications. It also enables an organization to evolve its technology stack. A "front end" is a collection of publicly callable web service operations. A "back end" is a collection of private services that can be invoked either by the front end or by other back-end services. A "test" is a series of front-end operations and associated assertions. A "failure" or "failed test" is an undesired/unexpected test outcome, either a failed assertion or front end operation exception. A "back-end service deployment" is a release of a new version of a service's codebase. A "tenant" is used in the "software as a service" (SaaS) sense of an "organization" that consumes a software product. For example, an organization consuming contact center software is a tenant in relation to the provider of the software. A "root cause" is one or more changes made to the software system that caused a failure or a failed test. A "management action" is an action taken through a centralized management tool affecting the operation of a software system. Possible management actions, for example, include back-end service deployment, feature flag changes, and rebooting virtual machines. Management actions may be automated via an API. A "feature flag" refers to a software development concept that allows a feature to be enabled or disabled a feature without modifying the source code or requiring a redeploy. Feature flags are commonly referred to as feature toggles, release toggles, or feature flippers. At a basic level, feature flags take the form of simple conditionals (e.g., if-else statements) that determine the code path that will be executed. Feature flags determine at runtime which portions of code are executed, which allows new features to be deployed without making them visible to users or making the features visible only to specific subsets of users and environments. Thus, a "feature flag" may be a change of state of a tenant-specific system-wide flag (i.e., changing from true to false or vice versa). In accordance with exemplary embodiments, the enabling or disabling of a feature flag may be considered as a source of a breaking change as well as a possible resolving management action for remedying a breaking change.

In accordance with exemplary embodiments, a time-stamped historical database of test executions is maintained that includes test results and respective log message outputs as well as success/failure status. This database, which may be referred to as a historical test result database, may be parsed for each instance of a test failure and the associated log message and other related data. In addition, a time-stamped historical database of management actions taken by engineers is maintained, which may be referred to as a historical management action database. From these data sources, a training dataset may be constructed that can be used to train a machine learning model, which, in certain embodiments, may be configured as a deep learning model. To construct the training dataset, a plurality of training examples may be harvested from the above databases. For example, the log message associated with a failed test execution in the historical test result database may be provided as an input of the test example. The log message associated with a failed test may include information describing the nature of the failure and/or classify a failure type associated with a failed test. As will be appreciated, the log message may include other relevant data that may be extracted as a feature property for a failed test. The "ground truth" or desired output of the training example then becomes the set of the management actions, as recorded in the historical management action database, that were completed by engineers in the time interval between the failed test execution and the next successful test execution.

In accordance with exemplary embodiments, the machine learning model may then be trained using the training dataset. For example, the machine learning model learns to map from the data gathered related to a test failure, e.g., the test log message, to management actions that, once applied, remedy the failed test. In this way, the machine learning model may be trained to output one or more recommended management actions that are predicted to remedy the failure. In some embodiments, the machine learning model is trained to output a probability distribution over a set of possible management actions for a given log message input. Specifically, for each possible management action, the output may contain the probability that that particular management action or set of management actions will remedy the breaking change. Once this is completed, the management action or set of management actions having a probability exceeding some threshold can then be automatically executed to address a breaking change.

In some embodiments, the model may be trained on live production data so that it may produce the same recommended management actions without the need for the failed test or failed test data. In such cases, production log messages may be used to train the model so that it is able to detect and predict recommended management actions. In either case, new instances of failure or undesirable functionality together with contextual data that cause it may be used to update or retrain the machine learning model.

Figure 4:
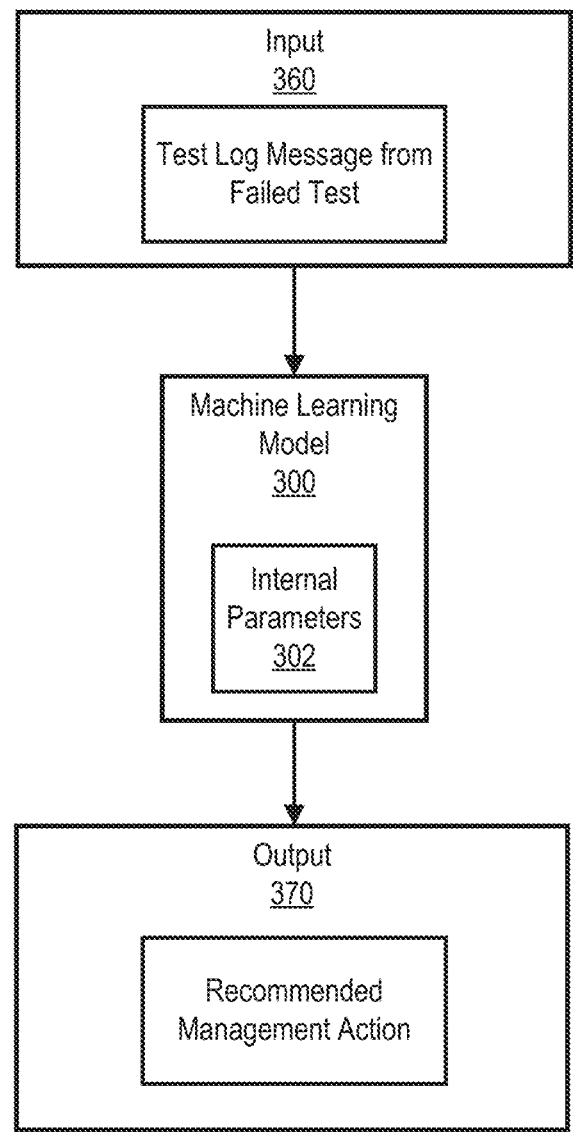
FIG. 4 is a simplified flow diagram demonstrating functionality of a machine learning model in accordance with embodiments of the present invention.

FIG. 4 illustrates use of the machine learning model 300 to perform inference on input 360 comprising data relevant to remedying breaking changes in software systems, such microservice-based software applications in contact center systems. For example, input 360 may include data related to a failed test (or "failed test data"), which may include a test log message from the failed test. The machine learning model 300 performs inference on the data based on its internal parameters 302 that are learned through training. The machine learning model 300 generates an output 370 of one or more recommended management actions for remedying the breaking change.

Figure 5:
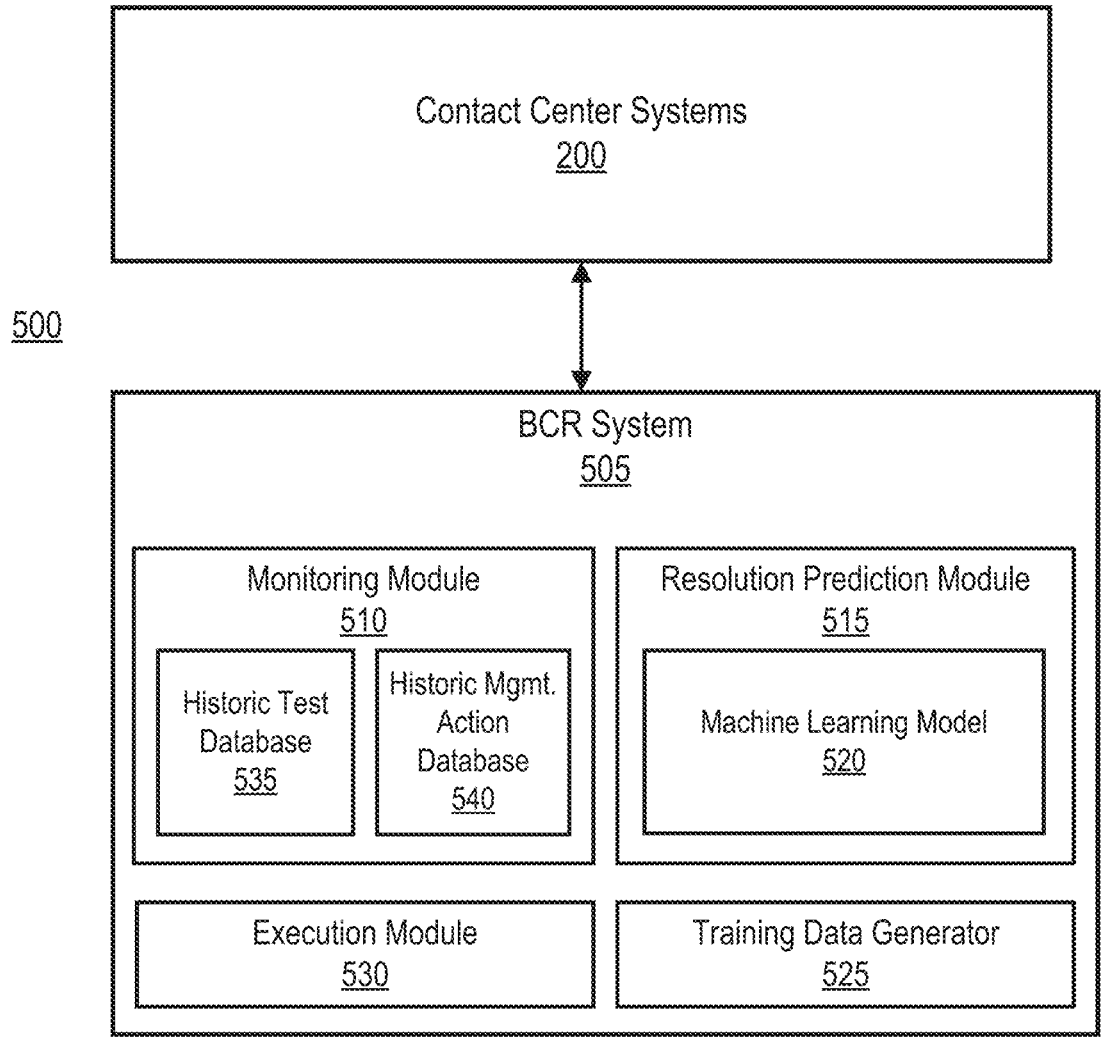
FIG. 5 is a schematic representation of a breaking change resolution system in accordance an embodiment of the present invention.

FIG. 5 illustrates an exemplary breaking change resolution (BCR) system 505 according to an exemplary embodiment of the present invention. The BCR system 505 may interact with the contact center systems 200 in the manner described herein to achieve the desired functionality. The BCR system 505 may interface with the contact center systems 200 through API calls, data streams, inter-process messages, shared data structures, or other methods. In some embodiments, the BCR system 505 is a separate program from the contact center systems 200. In other embodiments, the BCR system 505 is a sub-program or component of the contact center systems 200. According to exemplary embodiments, the BCR system 505 may include several modules, including a monitoring module 510, a resolution prediction module 515, a training data generator 525, and an execution module 530, each of which will now be described. As will be appreciated, the BCR system 505 may include various combinations of the features described herein. In some embodiments, it may include all the functionalities/modules described herein, and, in other embodiments, it includes only a subset of the functionalities/modules described.

The monitoring module 510 may be configured to monitor system events, including testing results and other data for detecting the occurrence of breaking changes, associated with the contract center systems 200. Such monitoring may include communication channels associated with such functionality. As shown, the monitoring module 510 may also include one or more databases, which may include a historical test result database 535 and a historical management action database 540 for recording data gleamed from monitoring. As introduced above, the historical test result database 535 may store data describing test executions along with their log message output and success/failure status. As described above, this database may be parsed for each instance of a test failure and the log message and other data associated with the test failure. The historical management action database 540 may store data describing management actions taken by engineers to address breaking changes.

The training data generator 525 may create additional training examples comprising corresponding sets of failed tests (and associated log messages) and the management actions that resolved the failed test. The training data generator 525 may achieve this via parsing data stored in the historical test result database 535 and historical management action database 540. The training data generator 525 may track the availability of new training examples for scheduling updates to the machine learning model 520, i.e., retraining of the model according to a training dataset having more recently gathered training examples.

The execution module 530 may be configured to interface/interact with the contact center systems 200 for executing recommended management actions that are predicted to resolve a current or present breaking change. Such execution of recommended management actions may be automated, for example, via an API. The execution module 530 may also be configured to send messages to user devices of predetermined personnel or engineers in cases where operators require human approval before recommended management actions are implemented.

The resolution prediction module 515 may include machine learning model 520 to power its functionality, including learning algorithms that learn from data as well as rule-based systems that use hard-coded rules or heuristics. Although illustrated as one unit, multiple machine learning models 520 may be used in practice to perform or implement different functionality. For example, each function described herein may have a separate machine learning model. The machine learning model 520 may receive an input of data associated with a failed test and calculated a recommended management action as an output. As part of the input, the log message output associated with the failed test as well as other information related to the failed test may be provided to the machine learning model 520. Optionally, the information provided as part of the input may be the management actions taken between the last previous successful test and the failed test. Such data is provided as input to the machine learning model 520 which has been trained to output a prediction as to one or more recommended management actions that resolves the failed test.

In exemplary embodiment, the machine learning model 520 may be configured according to desirability of particular machine learning algorithms for achieving the functionality described herein. As an example, the machine learning model 520 may include one or more neural networks. More specifically, the machine learning model 520 may include a recurrent neural networks (RNNs), which are generally effective for processing sequential data, such as text, audio, or time series data. Such models are designed to remember or "store" information from previous inputs, which allows them to make use of context and dependencies between time steps. This makes them useful for tasks such as language translation, speech recognition, and time series forecasting. In some embodiments, the RNN may include long short-term memory (LSTM) networks or gated recurrent units (GRUs). Both LSTMs and GRUs are designed to address the problem of "vanishing gradients" in RNNs, which occurs when the gradients of the weights in the network become very small and the network has difficulty learning. LSTM networks are a type of RNN that use a special type of memory cell to store and output information. These memory cells are designed to remember information for long periods of time, and they do this by using a set of "gates" that control the flow of information into and out of the cell. The gates in an LSTM network are controlled by sigmoid activation functions, which output values between 0 and 1. The gates allow the network to selectively store or forget information, depending on the values of the inputs and the previous state of the cell. GRUs, on the other hand, are a simplified version of LSTMs that use a single "update gate" to control the flow of information into the memory cell, rather than the three gates used in LSTMs. This makes GRUs easier to train and faster to run than LSTMs, but they may not be as effective at storing and accessing long-term dependencies. In other embodiments, the machine learning model 520 may be configured as a sequence to sequence model comprising a first encoder model and a decoder model. The first encoder may comprise a RNN, or convolutional neural network (CNN), or another machine learning model capable of accepting sequence input. The decoder may comprise a RNN, CNN, or another machine learning model capable of generating sequence output. The sequence to sequence model may be trained on training examples, wherein each training example includes a failed test data as input information and management action data that resolved the failed test as the desired output. For example, the sequence to sequence model may be trained by inputting the input data to the first encoder model to create a first embedding vector. The first embedding vector may be input to the decoder model to create an output result of a recommended management action. The output result may be compared to the actual management actions that resolved the breaking change, and the parameters of the first encoder and the decoder may be adjusted to reduce the difference between the output result and the training correct management action. The parameters may be adjusted through backpropagation. In an embodiment, the sequence to sequence model may include a second encoder which takes in additional information related to the failed test/breaking change to create a second embedding vector. The first embedding vector may be combined with the second embedding vector as input to the decoder. For example, the first and second embedding vectors may be combined using concatenation, addition, multiplication, or another function. In an embodiment, the decoder may take additional inputs comprising one or more features extracted from the additional information. For example, the features may comprise the failure type of the failed test as identified or described in the log message and/or preceding management actions. In another example, the features may comprise statistics computed on the count and order of words or characters in the information provided in the log message.

In other embodiments, the machine learning model for outputting a recommended management action may be an unsupervised model, such as a deep learning model. The unsupervised model is not trained and instead identifies its predictions based on identification of patterns in the data. In an embodiment, the unsupervised machine learning model may identify common features in the training dataset. In an embodiment, the recommended management actions may include a natural language summary describing the actions. For example, the natural language summary may be generated by a machine learning model. A sequence to sequence model may be trained where an encoder creates an embedding based on the sequence of management actions, and the decoder generates a natural language summary.

Figure 6:
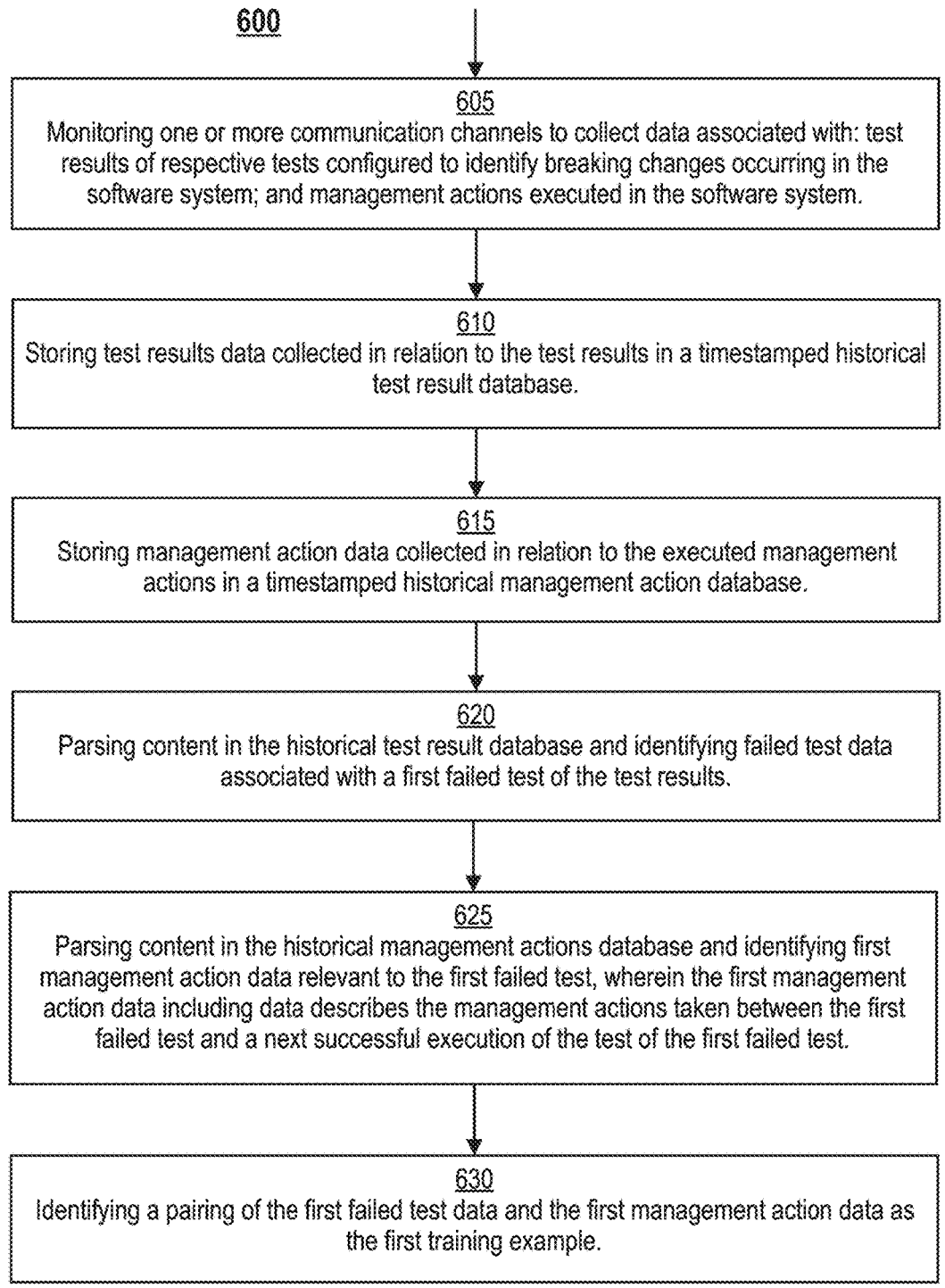
FIG. 6 is an training data process for generating training examples for a training dataset according to an embodiment of the present invention.

With reference now to FIG. 6, an exemplary training data process 600 is shown that illustrates an embodiment of the present invention. As will be appreciated, the operation demonstrated via the process 600 may be executed by the modules described in relation to the BCR system 505, including, for example, the training data generator 525. The training data process 600 may be used to generate a training dataset that includes training examples. When described in relation to the generation of a first training example that is representative of how each of the training examples are generated, the training data process 600 may include the following steps.

The training data process 600 begins, at step 605, by monitoring one or more communication channels to collect data associated with: test results of respective tests configured to identify breaking changes occurring in the software system; and management actions executed in the software system. At step 610, the training data process 600 continues by storing test results data collected in relation to the test results in a timestamped historical test result database. At step 615, the training data process 600 continues by storing management action data collected in relation to the executed management actions in a timestamped historical management action database. At step 620, the training data process 600 continues by parsing content in the historical test result database and identifying failed test data associated with a first failed test of the test results. At step 625, the training data process 600 continues by parsing content in the historical management actions database and identifying first management action data relevant to the first failed test, the first management action data including data describing the management actions taken between the first failed test and a next successful execution of the test of the first failed test. At step 630, the training data process 600 continues by identifying the first failed test data and the first management action data as the first training example.

Figure 7:
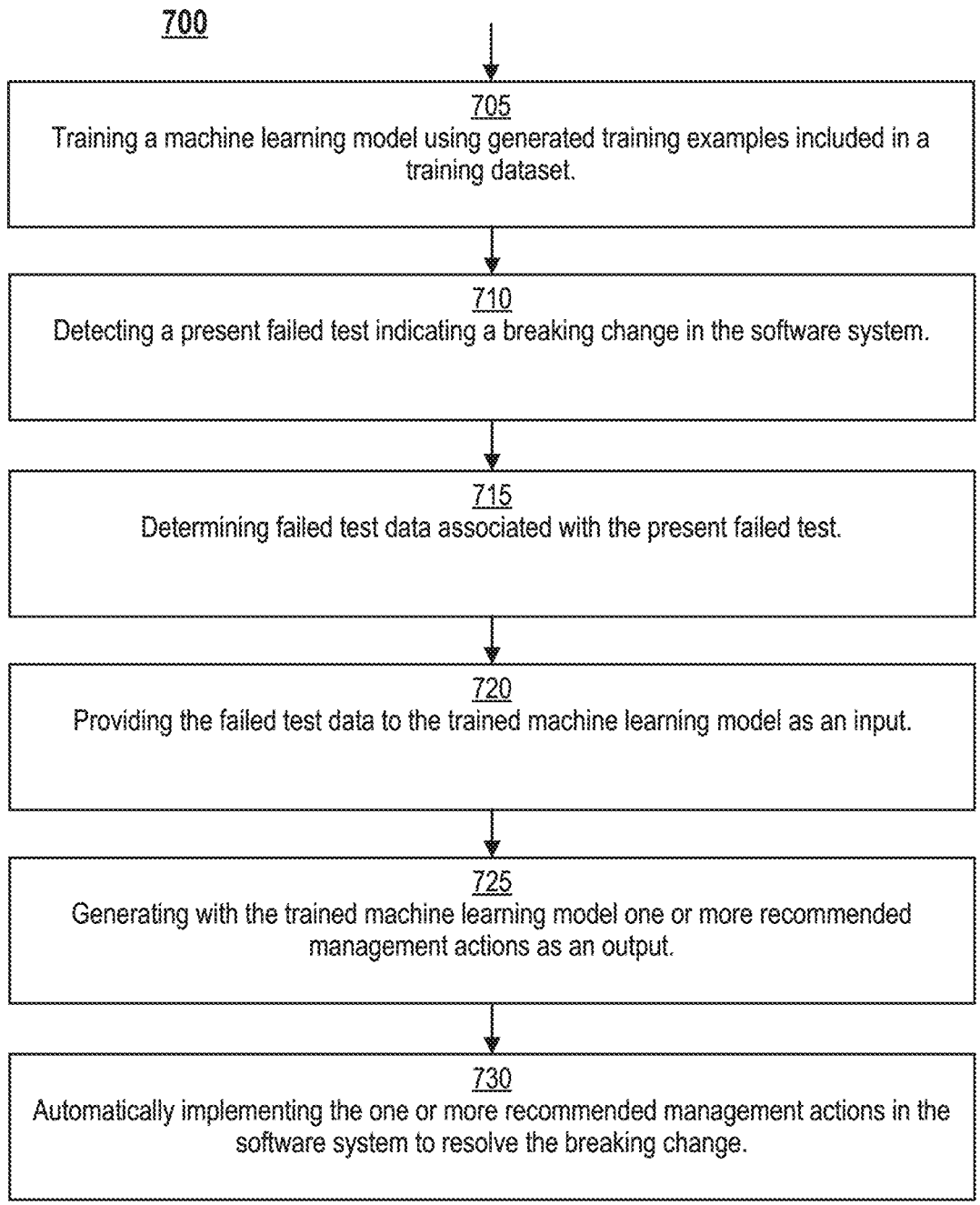
FIG. 7 is a method for training and using an machine learning model in accordance with an embodiment of the present invention.

With reference now to FIG. 7, an exemplary method 700 is shown that illustrates an embodiment of the present invention. The method 700 illustrates a process by which the generated training dataset is used to train a machine learning model that is then used to resolve breaking changes via an automated process. The method 700 begins, at step 705, by training a machine learning model using the training examples (as generated above) that are included in a training dataset. At step 710, the method 700 continues by detecting a present failed test indicating a breaking change in the software system. At step 715, the method 700 continues by determining failed test data associated with the present failed test. At step 720, the method 700 continues by providing the failed test data to the trained machine learning model as an input. At step 725, the method 700 continues by generating with the trained machine learning model one or more recommended management actions as an output. At step 730, the method 700 continues by automatically implementing the one or more recommended management actions in the software system to resolve the breaking change. In alternative embodiments, the method seek human approval before proceeding with implementation of the one or more recommended management actions. In such cases, the method may include the steps of: generating an electronic communication requesting approval for implementing the one or more recommended management actions and transmitting the generated electronic communication to a predetermined user device; and implementing the one or more recommended management actions in response to receiving a reply electronic communication from the predetermined user device granting the requested approval.

In exemplary embodiments, the machine learning model may include a neural network. The machine learning model may include a deep learning model. The deep learning model may be configured to learn via a self-supervised learning process and include a neural network having at least 2 hidden layers.

In exemplary embodiments, the failed test data associated with the first failed test may include a log message output generated in relation to the first failed test. The log message output may be one that classifies a failure type of the first failed test. In certain embodiments, the failed test data associated with the first failed test may include preceding management action data, where the preceding management action data includes data describing the management actions taken during a period defined between the first failed test and a most recent pass result for the test of the first failed test.

In exemplary embodiments, when described in relation to the first training example, which is representative of how each of the training examples are used to train the machine learning model, the step of training the machine learning model includes: providing as input to the machine learning model the first failed test data of the first training example; generating as output of the machine learning model one or more recommended management actions; comparing the first management action data describing the management actions resolving the first failed test to the one or more recommended management actions and, via the comparison, determining a difference therebetween; and adjusting parameters of the machine learning model to reduce the determined difference. The parameters may be adjusted through backpropagation.

In predicting the one or more recommended management actions, the machine learning model may be trained to output a probability distribution over a set of possible management actions for a given input of failed test data. In such cases, exemplary embodiments may further include the step of selectively automatically implementing the one or more recommended management actions in the software system based on whether a probability calculated in relation to the one or more recommended management actions exceeds a predetermined threshold probability.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. Further, it should be apparent that the foregoing relates only to the described embodiments of the present application and that numerous changes and modifications may be made herein without departing from the spirit and scope of the present application as defined by the following claims and the equivalents thereof.

That which is claimed:

1. A computer-implemented method for resolving breaking changes in a software system, the method comprising:
    generating, via an automated training data process, a training dataset comprising training examples, wherein, when described in relation to the generation of a first training example that is representative of how each of the training examples are generated, the automated training data process comprises:
        monitoring one or more communication channels to collect data associated with: test results of respective tests configured to identify breaking changes occurring in the software system; and management actions executed in the software system;
        storing test results data collected in relation to the test results in a timestamped historical test result database;
        storing management action data collected in relation to the executed management actions in a timestamped historical management action database;
        parsing content in the historical test result database and identifying failed test data associated with a first failed test of the test results;
        parsing content in the historical management actions database and identifying first management action data relevant to the first failed test, the first management action data comprising data describing the management actions taken between the first failed test and a next successful execution of the test of the first failed test;
        identifying the first failed test data and the first management action data as the first training example;
    training a machine learning model using the training examples included in the training dataset;
    using the trained machine learning model to predict one or more recommended management actions by:
        detecting a present failed test indicating a breaking change in the software system;
        determining failed test data associated with the present failed test;
        providing the failed test data to the trained machine learning model as an input and generating therewith the one or more recommended management actions as an output.

2. The computer-implemented method of claim 1, further comprising the step of:
    automatically implementing the one or more recommended management actions in the software system.

3. The computer-implemented method of claim 1, further comprising the step of:
    generating an electronic communication requesting approval for implementing the one or more recommended management actions and transmitting the generated electronic communication to a predetermined user device; and
    implementing the one or more recommended management actions in response to receiving a reply electronic communication from the predetermined user device granting the requested approval.

4. The computer-implemented method of claim 2, wherein the software system comprises a microservice-based software application associated with a contact center, the microservice-based software application comprising an application structured as a collection of services that are coupled yet independently deployable; and
    wherein a breaking change is defined as a change in one of the services that causes another one of the services to fail or produce an undesirable result.

5. The computer-implemented method of claim 2, wherein a set of possible ones of the management actions comprise at least: a back-end service deployment, a change to a feature flag, and rebooting of a virtual machine.

6. The computer-implemented method of claim 2, wherein the machine learning model comprises a neural network.

7. The computer-implemented method of claim 2, wherein the machine learning model comprises a deep learning model, wherein a deep learning model comprises a configuration to learn via a self-supervised learning process and a neural network having at least 2 hidden layers.

8. The computer-implemented method of claim 2, wherein the failed test data associated with the first failed test comprises a log message output generated for the first failed test.

9. The computer-implemented method of claim 8, wherein the log message output classifies a failure type of the first failed test.

10. The computer-implemented method of claim 8, wherein the failed test data associated with the first failed test comprises preceding management action data, the preceding management action data comprising data describing the management actions taken during a period defined between the first failed test and a most recent pass result for the test of the first failed test.

11. The computer-implemented method of claim 8, wherein, when described in relation to the first training example, which is representative of how each of the training examples are used to train the machine learning model, the step of training the machine learning model comprises:
   providing as input to the machine learning model the first failed test data of the first training example;
   generating as output of the machine learning model one or more recommended management actions;
   comparing the first management action data describing the management actions resolving the first failed test to the one or more recommended management actions and, via the comparison, determining a difference therebetween; and
   adjusting parameters of the machine learning model to reduce the determined difference.

12. The computer-implemented method of claim 11, wherein the parameters are adjusted through backpropagation.

13. The computer-implemented method of claim 1, wherein, in predicting the one or more recommended management actions, the machine learning model is trained to output a probability distribution over a set of possible management actions for a given input of failed test data.

14. The computer-implemented method of claim 13, further comprising the step of:
   selectively automatically implementing the one or more recommended management actions in the software system based on whether a probability calculated in relation to the one or more recommended management actions exceeds a predetermined threshold probability.

15. A system for resolving breaking changes in a software system, the system comprising:
   a processor; and
   a memory storing instructions which, when executed by the processor, cause the processor to perform the steps of:
      generating, via an automated training data process, a training dataset comprising training examples, wherein, when described in relation to the generation of a first training example that is representative of how each of the training examples are generated, the automated training data process comprises:
         monitoring one or more communication channels to collect data associated with: test results of respective tests configured to identify breaking changes occurring in the software system; and management actions executed in the software system;
         storing test results data collected in relation to the test results in a timestamped historical test result database;
         storing management action data collected in relation to the executed management actions in a timestamped historical management action database;
         parsing content in the historical test result database and identifying failed test data associated with a first failed test of the test results;
         parsing content in the historical management actions database and identifying first management action data relevant to the first failed test, the first management action data comprising data describing the management actions taken between the first failed test and a next successful execution of the test of the first failed test;
         identifying the first failed test data and the first management action data as the first training example;
      training a machine learning model using the training examples included in the training dataset;
      using the trained machine learning model to predict one or more recommended management actions by:
         detecting a present failed test indicating a breaking change in the software system;
         determining failed test data associated with the present failed test;
         providing the failed test data to the trained machine learning model as an input and generating therewith the one or more recommended management actions as an output.

16. The system of claim 15, wherein the memory stores further instructions that, when executed by the processor, cause the processor to perform the step of:
   automatically implementing the one or more recommended management actions in the software system.

17. The system of claim 15, wherein the memory stores further instructions that, when executed by the processor, cause the processor to perform the steps of:
   generating an electronic communication requesting approval for implementing the one or more recommended management actions and transmitting the generated electronic communication to a predetermined user device; and
   implementing the one or more recommended management actions in response to receiving a reply electronic communication from the predetermined user device granting the requested approval.

18. The system of claim 15, wherein the machine learning model comprises a neural network.

19. The system of claim 15, wherein the failed test data associated with the first failed test comprises a log message output generated for the first failed test; and
   wherein the log message output classifies a failure type of the first failed test.

20. The system of claim 19, wherein the failed test data associated with the first failed test comprises preceding management action data, the preceding management action data comprising data describing the management actions taken during a period defined between the first failed test and a most recent pass result for the test of the first failed test.

* * * * *